No. 694,810. Patented Mar. 4, 1902.
E. E. WALTERS.
ADJUSTABLE ELECTRIC LIGHT SUPPORT.
(Application filed Sept. 5, 1901.)
(No Model.)
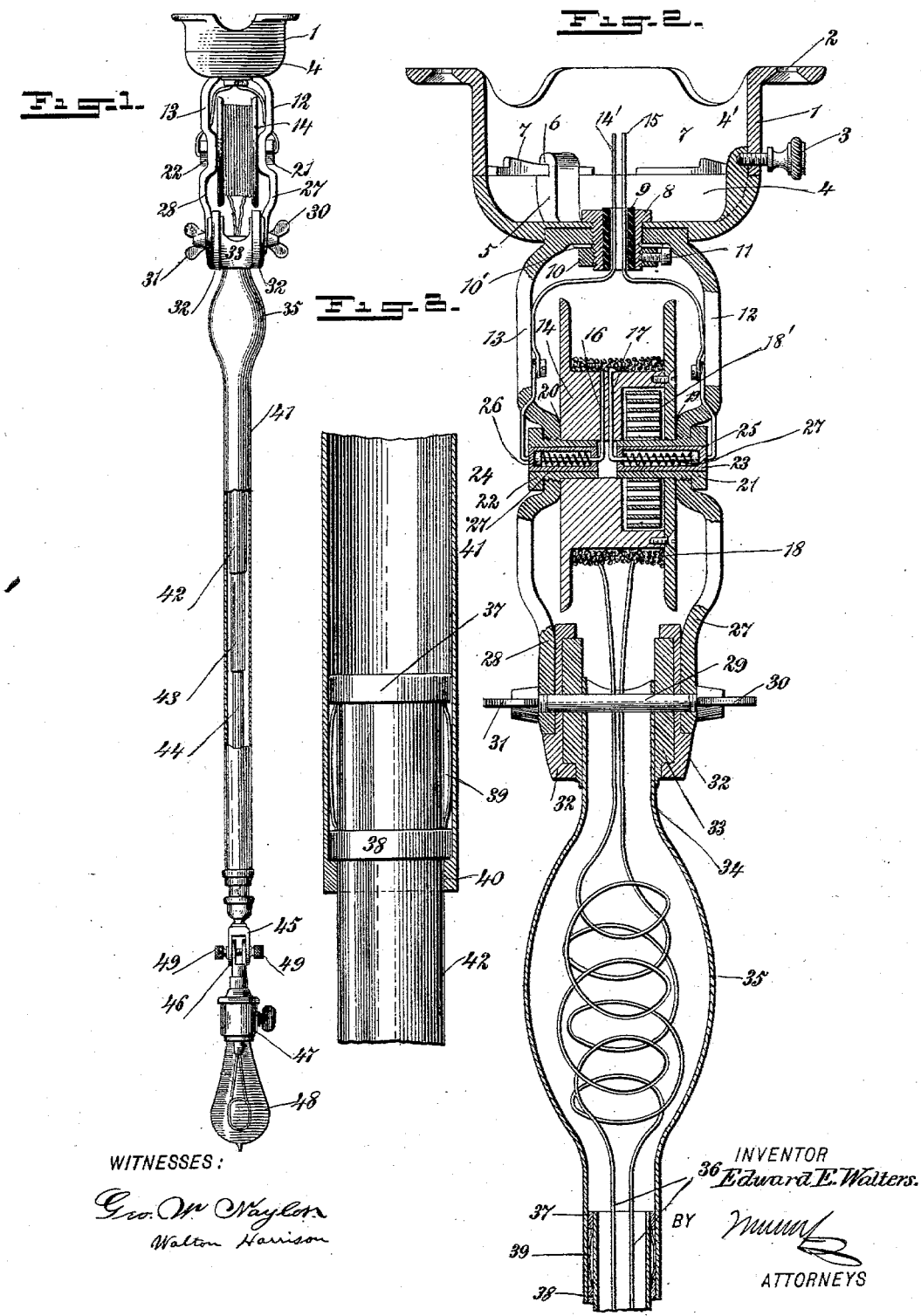
WITNESSES:
Geo. W. Naylor
Walton Harrison
INVENTOR
Edward E. Walters.
BY
ATTORNEYS
THE NORRIS PETERS CO., PHOTO-LITHO., WASHINGTON, D. C.

UNITED STATES PATENT OFFICE.

EDWARD E. WALTERS, OF LEHIGHTON, PENNSYLVANIA, ASSIGNOR OF TWO-FIFTHS TO BENJAMIN A. MINK, OF LEHIGHTON, PENNSYLVANIA.

ADJUSTABLE ELECTRIC-LIGHT SUPPORT.

SPECIFICATION forming part of Letters Patent No. 694,810, dated March 4, 1902.

Application filed September 5, 1901. Serial No. 74,413. (No model.)

*To all whom it may concern:*

Be it known that I, EDWARD E. WALTERS, a citizen of the United States, and a resident of Lehighton, in the county of Carbon and State of Pennsylvania, have invented a new and Improved Adjustable Electric-Light Support, of which the following is a full, clear, and exact description.

My invention relates to an electric-light shifter, the object of which is to permit the movement of an incandescent or similar electric light around into different positions.

Reference is to be had to the accompanying drawings, forming a part of this specification, in which similar characters of reference indicate corresponding parts in all the figures.

Figure 1 is an elevation showing certain parts broken away. Fig. 2 is an enlarged longitudinal section of the same, and Fig. 3 is a detail.

A cylindrical portion 1 is provided with screw-holes 2 for securing the same to a ceiling and with a thumb-screw 3 for securing the bowl-shaped portion 4 thereto. This bowl-shaped portion is provided internally with lugs 4' and 5, which have hooked ends, as shown at 6, for the purpose of engaging the wedge-shaped cam 7 when the bow-shaped portion 4 is twisted slightly with reference to the cylindrical portion 1. The thumb-screw 3 passes through the cylindrical portion 1 and engages one of the lugs 4', so as to hold said parts rigidly in position. This thumb-screw is loosened when it is desired to take said portions apart for any purpose.

In the bottom of the bowl-shaped member is a sleeve 8, provided internally with an insulating-tube 9, of hard rubber, and also provided with a collar 10 and a washer 10', said collar being screwed upon said sleeve and rigidly secured in position by a separate screw 11. Mounted upon the sleeve 8 and washer 10' are a pair of spring-arms 12 13, which engage the opposite sides of a revoluble spool 14. Two insulated-wire conductors 14' 15 pass downward through the insulating-tube 9 and engage the ends of sleeves 23 and 24, forming electrical connections therewith. Inside of these sleeves are two small pistons 25 26, preferably of copper, which are kept in engagement with the ends of the sleeves by means of springs 27 for the purpose of making a continuous and elastic connection between the wires 14' 15 and the wires 16 17, to which are secured wire cords, partially wound upon the spool 14, forming several layers, as shown at 18, and extend downward, as shown at 36. A spiral spring 18' actuates the spool 14 in one direction and is put under stronger tension by the rotation of the spool in the opposite direction, whereby said wire is unwound. The inner sides of the spring-arms 12 and 13 are provided with friction-surfaces 19 20, which bind gently upon the spool 14 with more or less pressure, according to the amount of pressure exerted by the bolt 29, which is provided with thumb-nuts 30 and 31 upon the lower ends of the spring-arms. By tightening these nuts the lower ends 27 28 of the arms are drawn slightly together owing to the resiliency of the hollow members through which the bolt passes, and the free movement of the spool is thereby governed at will. The lower ends of the spring-arms are sunken in bearings 32, in which a partially-revoluble head 33 is free to move when the pressure of the screws 30 31 is relaxed. The spool is mounted upon sleeves 21 22, secured in the spring-arms. The pistons 25 26 constitute swivels which readily turn with the spool. The bolt 29 also serves as a shaft upon which the member 41 may rock in the arc of a circle, and the tightening of the thumb-nuts 30 31 serves to fix the tubular member 41 at any angle desired. This tubular member is provided with an enlargement or bulb 35 and with an internal shoulder 40. Inside of this tubular member is a smaller tubular member 42, the upper end of which is provided with bands 37 38, fixed relatively thereto, and with bow-shaped springs 39 for engaging the sides of the tube, as shown more particularly in Fig. 3. The tubular members 41, 42, 43, and 44 telescope one within the other, as shown in Fig. 1, the ultimate effect of which is that said members when fully extended are capable of reaching a length nearly four times as great as any one of them. At the lower end of the inner member 44 is a yoke 45, provided with a screw 46, upon the ends of which are mounted thumb-nuts 49. Inside of the yoke is secured the upper portion of an incandescent electric lamp 47, provided with a globe 48 in the usual manner.

The operation of my device is as follows: By tightening or loosening the thumb-nuts 30 31 the spring-arms are drawn slightly nearer each other or allowed to spring slightly apart, as the case may be, thus governing the freedom of motion of the spool 14. The adjustment being made as desired, if the electric light be moved in a direction to extend the telescoping members and then moved back again, so as to contract the length of the same, the slack in the wire cords will be wound upon the spool 14 if the adjustment is such as to allow the spool to move freely. In case, however, the adjustment does not allow the spool to revolve freely a part of the slack is taken up by the bulb 35. In other words, the spool 14 under ordinary conditions takes up all the slack of the wire cords; but when it is not desirable to disturb the thumb-pieces 30 and 31 for the reason that it is desired to keep the member 41 at a certain angle relatively to the axis 29 the fact that the spool fails to rotate or rotates imperfectly is of no consequence, for the reason that the extra slack is taken up by the bulb. It appears, therefore, that there is a certain coactive relation existing between the spool, the bulb, and the means for adjusting the spring-arms. It will therefore be observed that the spring-arms are revoluble around the sleeve 8 as a center, while the tubular members as a whole have a certain amount of radial play around the bolt 29 as a center, and the incandescent bulb is somewhat similarly movable in the arc of a circle at the extreme lower end of the tubular member 44. This arrangement gives the lamp great adaptability, and as the several movements are adjustable by friction devices governable at will all or any of the movable parts mentioned can be locked rigidly in any desired position.

If desired, the spool may be omitted altogether, so that the wire cords will run directly into the bulb.

Having thus described my invention, I claim as new and desire to secure by Letters Patent—

1. An adjustable support for electric lamps, comprising a frame, an extensible member secured thereto and provided with an electric lamp and also with a hollow bulb, a spool mounted within said frame and provided with flexible electrodes leading to said lamp, electrodes leading from a source of electrical supply to said spool, a spring for normally winding said spool in one direction, spring-arms for governing the freedom of movement of said spool, and an adjusting device controllable at will for governing the pressure of said spring-arms.

2. An adjustable support for electric lamps, comprising a cylindrical member provided interiorly with wedge-shaped cams, a bow-shaped member provided interiorly with hooked lugs for engaging said wedge-shaped cams and provided centrally with an aperture, a sleeve mounted in said aperture, a pair of spring-arms secured to said sleeve, a spool provided with flexible electrodes normally wound thereon and located between said spring-arms, a spring for actuating said spool in one direction, a manually-controlled adjusting device for governing the tension of said spring-arms upon said spool, an extensible member provided with an electric lamp, said lamp being connected with said flexible electrodes, and means for supplying an electric current to said flexible electrodes.

3. An adjustable support for electric lamps, comprising a frame, a spool mounted thereon and wound with flexible electrodes, means for supplying an electric current to said electrodes, a spring for rotating said spool in one direction, an adjusting device for controlling the freedom of motion of said spool, and a hollow member connected with said frame and provided with a bulb, the arrangement being such that said spool according to its adjustment is normally free to take up the slack of said flexible electrodes, and said bulb is adapted to take up said slack when said spool fails to do so.

4. An adjustable support for electric lamps, comprising a casing provided with fastenings and with a central aperture, a sleeve journaled in said aperture, a pair of spring-arms revolubly connected with said sleeve, a bolt provided with thumb-nuts and passing through said spring-arms, a telescopic member provided with a bulb and with a pair of friction-plates for engaging said spring-arms, an electric lamp connected with said telescopic member, and means for supplying a current of electricity to said electric lamp.

In testimony whereof I have signed my name to this specification in the presence of two subscribing witnesses.

EDWARD E. WALTERS.

Witnesses:
B. A. MINK,
HENRY SCHWARTZ.